United States Patent [19]
Bauman

[11] 3,742,012
[45] June 26, 1973

[54] QUATERNARY STYRYL DYESTUFFS

[75] Inventor: Donald Lee Bauman, Wilmington, Del.

[73] Assignee: E. I. du Pont de Nemours & Co., Wilmington, Del.

[22] Filed: Jan. 13, 1972

[21] Appl. No.: 217,934

[52] U.S. Cl............... 260/465 D, 8/15, 8/7, 260/465.4, 260/567.6 M
[51] Int. Cl................................ C07c 121/70
[58] Field of Search................. 260/465 D

[56] References Cited
UNITED STATES PATENTS
3,247,215   4/1966   Fisher et al.................. 260/465 X

*Primary Examiner*—Lewis Gotts
*Assistant Examiner*—Dolph H. Torrence
*Attorney*—Francis J. Crowley

[57] ABSTRACT

Green-yellow dyes having the structure

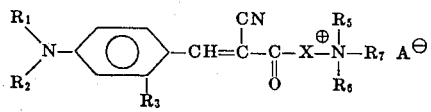

wherein each of $R_1$ and $R_2$ is lower alkyl or cyanoethyl, $R_3$ is H, methyl, methoxy or chloro, X is -O-alkylene or -NH-alkylene, $R_5$ is lower alkyl, $R_6$ is lower alkyl or cyclohexyl, $R_7$ is lower alkyl or benzyl and $A^\ominus$ is an anion.

4 Claims, No Drawings

QUATERNARY STYRYL DYESTUFFS

BACKGROUND OF THE INVENTION

1. Field of the Invention

This invention relates to novel green-yellow pendant cationic dyes which are particularly useful in the dyeing of paper showing good substantivity and tinctorial strength thereon and being capable of ready and complete removal therefrom with bleaching agent.

2. Description of the Prior Art

In light of existing concern over the conservation and efficient use of natural resources, the development and commercial use of processes for recycling raw materials is expanding rapidly. In the paper industry for example, the re-use of paper is becoming increasingly common, particularly with regard to cheaper grades of paper which may contain up to 80 percent of ground wood. For paper to be effectively recycled and reused, however, it is important that the dyes used to color such paper be readily and completely dischargeable therefrom at the time of recycling. Most known paper dyes are subjected to a bleach treatment with sodium or calcium hypochlorite to effect this result, but even then, many dyes cannot be completely removed.

Novel cationic dyes have now been discovered which impart bright, green-yellow shades to paper. These dyes are inexpensive to produce and possess good tinctorial strength and substantivity on paper. Further, these dyes are readily and completely removed from paper by treatment with hypochlorite or with sodium or zinc hydrosulfite.

SUMMARY OF THE INVENTION

The present invention is directed to pendant green-yellow cationic dyes having the structure:

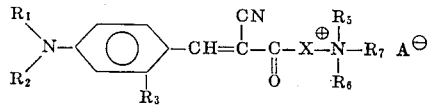

wherein each of $R_1$ and $R_2$ is $C_{1-2}$ alkyl or cyanoethyl,
$R_3$ is H, $CH_3$, $OCH_3$ or Cl,
X is

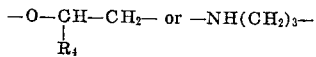

$R_4$ is H, $CH_3$ or $C_2H_5$,
$R_5$ is $CH_3$ or $C_2H_5$,
$R_6$ is $CH_3$, $C_2H_5$ or cyclohexyl,
$R_7$ is $CH_3$, $C_2H_5$ or benzyl, and
$A^\ominus$ is an anion.

DESCRIPTION OF THE INVENTION

The novel dyes of this invention are bright, green-yellow, cationic dyes of excellent tinctorial strength having good application and substantivity on paper and they may be readily and completely removed therefrom by the use of common art-recognized bleaching agents. The have the structure:

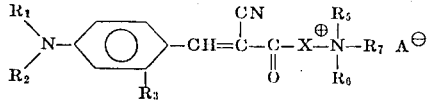

These dyes may be readily prepared by art-known techniques. For example, an aromatic aldehyde having the sturucture:

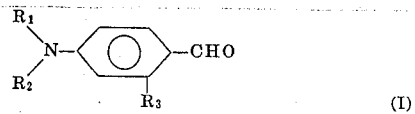

wherein each of $R_1$ and $R_2$ is methyl, ethyl or cyanoethyl and $R_3$ is H, methyl, methoxy or chloro may be condensed with an ester or amide of cyanoacetic acid, having the structure:

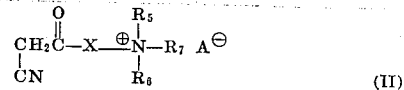

wherein X is

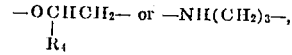

$R_4$ is H, methyl or ethyl, $R_5$ is methyl or ethyl, $R_6$ is methyl, ethyl or cyclohexyl, $R_7$ is methyl, ethyl or benzyl and A is preferably Cl, Br, I or methosulfate. The reaction can be conveniently carried out by mixing (II) (optionally dissolved in a minimum of water) and a solution of (I) in a water-miscible organic solvent such as acetic acid, ethylene glycol or dimethylformamide (DMF) and heating in the presence of a catalytic amount of piperidine. Alternatively, the unquaternized form of (II) may be condensed with the aldehyde (I), followed by quaternization of the resulting intermediate. Suitable quaternizing agents include alkyl chlorides, bromides, iodides and sulfates (wherein alkyl is preferably methyl or ethyl) and benzyl chloride and bromide.

The following aldehydes are among those within the scope of (I) above which are useful intermediates for preparing dyes of this invention.

p-(N,N-dimethylamino)benzaldehyde
p-(N,N-diethylamino)benzaldehyde
p-(N-cyanoethyl-N-ethylamino)benzaldehyde
p-(N,N-dicyanoethylamino)benzaldehyde
p-(N,N-diethylamino)-2-methylbenzaldehyde
p-(N-cyanoethyl-N-ethylamino)-2-methylbenzaldehyde
p-(N,N-dicyanoethylamino)-2-methylbenzaldehyde
p-(N,N-diethylamino)-2-chlorobenzaldehyde
p-(N,N-dicyanoethylamino)-2-methoxybenzaldehyde These aldehydes may be prepared from the corresponding N,N-disubstituted aniline, or meta-substituted derivative thereof, by, for example, an art-known Vilsmeier type reaction with DMF and phosphorus oxychloride.

The dyes of this invention may also be prepared by condensing an aldehyde (I) with an alkyl cyanoacetate and reacting the resulting intermediate ester with a compound of the formula $$H-X-\overset{\oplus}{\underset{R_6}{N}}\overset{R_5}{\underset{}{-}}R_7 \quad A^\ominus$$

(III)

wherein $R_5$, $R_6$, $R_7$, X and $A^\ominus$ are defined as hereinbefore. Alternatively, the unquaternized form of (III) may be used in this condensation, followed by treatment with a quaternizing agent $R_7A$.

Compounds having the structure (II) may be prepared by reacting an alcohol or amine of structure (III) with an alkyl cyanoacetate or a mixed anhydride of cyanoacetic acid and, for example, acetic acid. Alternatively, the unquaternized form of (III) may be used, quaternization being carried out in a subsequent step.

Amines of formula (III) may be prepared by reacting an amine of the structure

with acrylonitrile, quaternizing the adduct with a compound $R_7A$ and reducing the resulting intermediate in known manner. Alcohols of structure (III) may be prepared by reacting an amine of structure (IV) with an alkylene oxide such as propylene, butylene or preferably ethylene oxide and quaternizing the resulting aminoalcohol.

Examples of compounds of the structure (III) which are useful for preparing the subject dyes include:
(2-Hydroxyethyl)trimethylammonium methosulfate
(2-Hydroxypropyl)trimethylammonium iodide
(2-Hydroxybutyl)trimethylammonium chloride
Benzyldiethyl(2-hydroxyethyl)ammonium chloride
(2-Hydroxyethyl)triethylammonium chloride
Cyclohexyl(2-hydroxyethyl)dimethylammonium bromide
(3-aminopropyl)trimethylammonium methosulfate
(3-aminopropyl)cyclohexylethylmethylammonium chloride
(3-aminopropyl)triethylammonium iodide
(3-aminopropyl)benzyldimethylammonium bromide.

Anions other than those suggested above may also be associated with the subject dyes, the nature of the anion utilized being considered only with respect to the degree of solubility which it imparts to a given dye and this will of course vary with the particular use of the particular dye prepared. For example, the subject dyes may also be obtained as the fluoborates by precipitation from solution with sodium fluoborate, or as the zinc chloride double salts by precipitation of the dye chloride with zinc chloride.

The dyes of the subject invention are economical, tinctorially strong dyes with good substantivity on paper, giving bright, greenish yellow shades thereon. Furthermore, they have the valuable property of being completely discharged from paper by the action of hypochlorite or hydrosulfite. Thus, they are particularly suited for use on paper that is to be used over and over again by recycling.

The following examples are intended to be merely illustrative of the invention and not in limitation thereof. Unless otherwise indicated, all quantities are by weight.

EXAMPLES

PREPARATION OF ($\beta$-CYANOACETOXYETHYL)-TRIMETHYLAMMONIUM METHOSULFATE

A mixture of 28.3 parts of ethyl cyanoacetate, 26.8 parts of dimethylaminoethanol, 2 parts of tetraisopropyl titanate and 78 parts of cyclohexane was heated to the reflux temperature with stirring for 7 hours, the cyclohexane/ethanol azeotrope being removed as it was produced.

The mixture was cooled to room temperature and 37 parts of dimethyl sulfate were added dropwise. The resultant reaction mixture was then heated at 50°C. for 1 hour. Cyclohexane was decanted from the light yellow semi-solid formed and 60 parts of ethanol were added to the semi-solid. The mixture was stirred until the product thereof solidified. The solidified product was isolated by filtration and dried. The isolated off-white solid ($\beta$-cyanoacetatoxyethyl)-trimethylammonium methosulfate) (52.1 parts, 69 percent) was used for dye preparation without further purification.

EXAMPLE 1

Dye Preparation

A mixture of 26.5 parts of p-(N,N-diethylamino)-benzaldehyde, 42.3 parts of the ($\beta$-cyanoacetoxyethyl-)-trimethylammonium methosulfate prepared above, 170 parts of dimethylformamide (DMF) and 5 drops of piperidine was heated at 80°–90°C. with stirring for 4 hours. The solvent was then removed by means of a rotary evaporator. The partially solidified product was slurried in 250 parts of isopropanol, isolated by filtration and dried. The resultant granular solid (115.4 parts, 87 percent) had an absorptivity ($a_{max}$) of 120 liters g.$^{-1}$ cm.$^{-1}$ at 445 $\mu$. ($\lambda_{max}$). After recrystallization from a 9:1 (V/V) mixture of ethyl acetate and DMF, the solids melted at 150°–151°C. and had an absorptivity of 125 liters g.$^{-1}$ cm.$^{-1}$ at 445 m$\mu$.

Based on the above procedure, the structure of the dye is

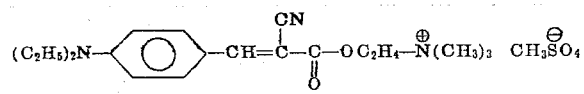

Using the same general procedures described in the preparation of the ($\beta$)-trimethylammonium methosulfate and in Example 1 above, but varying the reactants, the following dyes 2–7 were prepared. In each example dye 2–7, the dye has the general structure

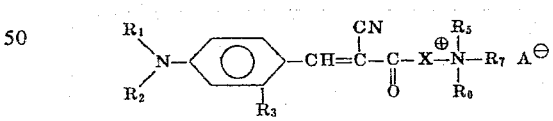

X is $OC_2H_4$, each of $R_5$, $R_6$, and $R_7$ is $CH_3$ and $A^\ominus$ is $CH_3SO_4^\ominus$.

| Example Dye | $R_1$ | $R_2$ | $R_3$ | $a_{max}$ (l.g.$^{-1}$ cm.$^{-1}$) | $\lambda_{max}$ (m$\mu$) |
|---|---|---|---|---|---|
| 2 | $CH_3$ | $CH_3$ | H | 88 | 440 |
| 3 | $C_2H_4CN$ | $C_2H_4CN$ | H | 85 | 415 |
| 4 | $C_2H_4CN$ | $C_2H_4CN$ | $CH_3$ | 64 | 422 |
| 5 | $C_2H_4CN$ | $C_2H_5$ | H | 99 | 430 |
| 6 | $C_2H_4CN$ | $C_2H_5$ | $CH_3$ | 119 | 440 |
| 7 | $C_2H_5$ | $C_2H_5$ | $CH_3$ | 120 | 455 |

EXAMPLE 8

Preparation of the Dye of Example 1 in Liquid Form

A mixture of 36.6 parts of acetic anhydride and 10.2 parts of cyanoacetic acid was heated at 50°C. for 1 hour and then cooled to 25°C. Twenty parts of choline chloride were added and the reaction mixture was warmed at 30°C. for 1 hour.

p-(N,N-diethylamino)benzaldehyde (21.2 parts) was then added and the reaction mixture was heated slowly to 80°C. and stirred at that temperature for 6 hours. Finally, 14 parts of water were added, yielding a solution of the dye of Example 1 having good storage stability. The solution exhibited an absorptivity of 58.0 $l.g.^{-1}$ $cm.^{-1}$ at 445 m$\mu$.

Using the same general procedure as that of Example 8, but varying the reactants, the following dyes 9–11 were prepared in solution form. Each of these dyes of examples 9–11 had the same general structure as the dye of examples 2–7 but $R_1$ and $R_2$ are each $C_2H_5$, $R_3$ is H, X is $OC_2H_4$ and $A^\ominus$ is believed to be a mixture of $Cl^\ominus$ and $CH_3COO^\ominus$.

| Example Dye | $R_5$ | $R_6$ | $R_7$ | $a_{max.}$ ($l.g.^{-1} cm.^{-1}$) | $\lambda_{max.}$ (m$\mu$) |
|---|---|---|---|---|---|
| 9 | $C_2H_5$ | $C_2H_5$ | $C_2H_5$ | 61.7 | 445 |
| 10 | $CH_3$ | –⟨S⟩– | $CH_3$ | 60.7 | 445 |
| 11 | $CH_3$ | $CH_3$ | $CH_2C_6H_5$ | 57.0 | 445 |

Preparation of ($\gamma$-Cyanoacetamidopropyl)trimethylammonium Methosulfate

A mixture of 113 parts of ethyl cyanoacetate, 112 parts of N,N-dimethylaminopropylamine and 215 parts of toluene were stirred at room temperature for 4 hours, after which 140 parts of dimethyl sulfate were added dropwise. The temperature rose to 65°C. The reaction mixture was stirred for another hour, during which time the temperature was allowed to fall to 25°–30°C. Toluene was decanted from the resulting oil, and the remaining solvent was then removed from the oil on a rotary evaporator. ($\gamma$-Cyanoacetamidopropyl)-trimethylammonium methosulfate was recovered as a light yellow oil (323 parts), and used without further purification in dye preparation.

EXAMPLE 12

Dye Preparation

A mixture of 5.73 parts of p-(N,N-diethylamino)-2-tolualdehyde, 10 parts of the ($\gamma$-cyanoacetamidopropyl)-trimethylammonium methosulfate prepared above, 35 parts of DMF and 3 drops of piperidine was heated at 80°–85°C. for 6 hours. The solvent was removed from the mixture on a rotary evaporator and ethyl acetate was added to the resulting dark oil, which oil subsequently solidified. The solids were collected by filtration and dried, yielding 14.5 parts of dye. The solids were recrystallized from a mixture of ethyl acetate and isopropanol. The purified dye had an m.p. of 166°–168°C. and an absorptivity ($a_{max}$) of 82 $l.g.^{-1}$ $cm.^{-1}$ at an $\lambda_{max}$ of 440 m$\mu$.

Based on the above procedure, the structure of the dye is

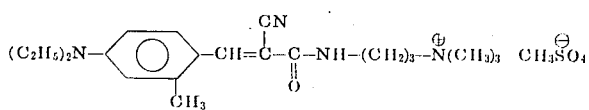

Using the same general procedure described in the preparation of the ($\gamma$-)trimethylammonium methosulfate and in Example 12 above but varying the reactants, the following dyes 13–16 were prepared. In each example dye 13–16 the dye has the same general structure as the dyes of examples 2–7, but X is $NHC_3H_6$, each of $R_5$, $R_6$ and $R_7$ is $CH_3$ and $A^\ominus$ is $CH_3^\ominus SO_4$.

| Example Dye | $R_1$ | $R_2$ | $R_3$ | $\lambda_{max.}$ (m$\mu$) | $a_{max.}$ ($l.g.^{-1} cm.^{-1}$) |
|---|---|---|---|---|---|
| 13 | $C_2H_4CN$ | $C_2H_4CN$ | H | 395 | 75 |
| 14 | $C_2H_4CN$ | $C_2H_4CN$ | $CH_3$ | 402 | 55 |
| 15 | $C_2H_4CN$ | $C_2H_5$ | $CH_3$ | 420 | 88 |
| 16 | $C_2H_5$ | $C_2H_5$ | H | 432 | 73 |

EXAMPLE 17

A mixture of 11.3 parts of ethyl cyanoacetate, 13 parts of $\gamma$-(N,N-diethylamino)propylamine, 50 parts of ethanol and 3 drops of piperidine was heated to the reflux temperature with agitation for 2 hours. The mixture was cooled to 60°C. and 14.9 parts of p-(N,N-dimethylamino)benzaldehyde were added. The mixture was then heated to the reflux temperature for 2 hours, cooled to 50°C., treated with 13.8 parts of benzyl chloride, heated again to the reflux temperature for 2 hours and stripped of solvent on a rotary evaporator. The resulting dark brown oil was stirred with 300 parts of acetone until the oil solidified. The solids were collected by filtration and dried, giving 28.6 parts (62 percent) of the dye.

A sample was recrystallized from a 9:1 acetone/isopropanol mixture. It melted at 152°–154°C. and had an absorptivity of 80.0 liters $g.^{-1}$ $cm.^{-1}$ at a $\lambda_{max}$ of 428 m$\mu$.

Based on the above procedure, the structure of the dye is:

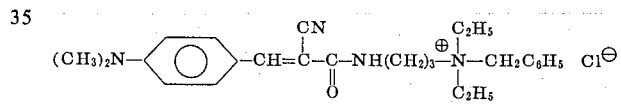

EXAMPLE 18

Dyeing of Catalog Furnish a. One thousand parts of catalog furnish (containing 62 percent ground wood and 38 percent unbleached sulfite pulp) were dispersed in 18,000 parts of water. Two parts of the dye of Example 1 and 10 parts of alum (commercial aluminum sulfate, $Al_2(SO_4)_3 \cdot 18H_2O$) were added and the mixture was agitated for about 30 minutes. Paper sheet was then formed by conventional procedures to yield paper which was dyed a green-yellow shade.

b. When an equivalent quantity of each of the dyes of Examples 2–17 was applied in turn to catalog furnish by the above procedure, greenish-yellow dyeings of comparable strength were obtained.

EXAMPLE 19

Dye Removal from Catalog Furnish a. One thousand parts of catalog furnish that had been dyed as described in, and using the dye of, Example 18a were heated in 18,000 parts of water containing 20 parts of sodium sulfite and 10 parts of sodium hydrosulfite at 140°F. for 1 hour. The green-yellow dye was completely decolorized.

b. When another sample of catalog furnish, but which had been dyed to a similar depth of shade with an art-known commercial green-yellow paper dye (the tetraethyl homologue of Auramine, C. I. 41,000) by the procedure of Example 18a, mμtreated with hydrosulfite as described in Example 19a above, the treated paper was only slightly ligher in shade than before the treatment.

The same type of catalog furnish was used in both Examples 18 and 19.

EXAMPLE 20

Dyeing of Bleached Sulfite Paper Pulp a. One thousand parts of bleached sulfite pulp were dispersed in 18,000 parts of water. Ten parts of the dye solution prepared in Example 8, 15 parts of rosin size, and 25 parts of alum were added and the mixture was agitated for about a ½ hour. Paper sheet was then formed by conventional procedures to yield paper which was dyed an attractive greenish-yellow shade.

EXAMPLE 21

Conventional Bleaching Process

Five parts of color paper, prepared as described in Example 20, and 95 parts of water were agitated at ambient temperature. Calcium (or sodium) hypochlorite was added to provide 2 percent available chlorine, based on the air-dry weight of the colored paper. The slurry was agitated for 5 minues and then diluted with cold water to provide a 0.5 percent concentration of paper fiber in the slurry. The resultant colorless paper fiber could then be made into paper which is free of color, by any art-known means.

When deeply colored paper is bleached, the amount of available chlorine used in the present example is increased to about 4 percent.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. Green-yellow pendant cationic dyes having the structure

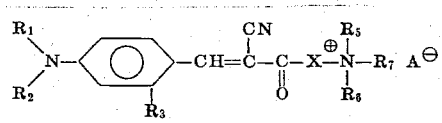

wherein each of $R_1$ and $R_2$ is $C_{1-2}$ alkyl or cyanoethyl,
$R_3$ is H, $CH_3$, $OCH_3$ or Cl,
X is

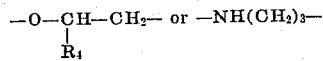

$R_4$ is H, $CH_3$ or $C_2H_5$,
$R_5$ is $CH_3$ or $C_2H_5$,
$R_6$ is $CH_3$, $C_2H_5$ or cyclohexyl,
$R_7$ is $CH_3$, $C_2H_5$ or benzyl, and
$A^\ominus$ is an anion.

2. A dye according to claim 1 having the structure

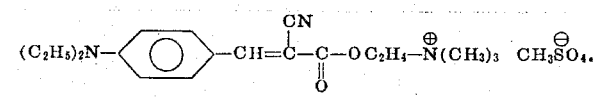

3. A dye according to claim 1 having the structure

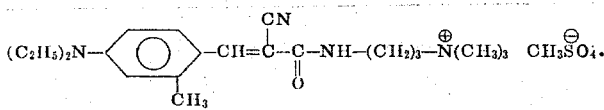

4. A dye according to claim 1 having the structure

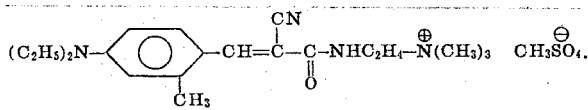

* * * * *